United States Patent

Kambayashi et al.

[11] Patent Number: 5,970,044
[45] Date of Patent: Oct. 19, 1999

[54] DISC CLAMPING DEVICE

[75] Inventors: Makoto Kambayashi, Neyagawa; Shingo Kage, Kobe; Yasunari Toyama, Osaka; Nobuyuki Miroku, Ikoma, all of Japan

[73] Assignee: Matsushita Electric Industrial Co., Ltd., Kadoma, Japan

[21] Appl. No.: 08/991,896

[22] Filed: Dec. 16, 1997

[30] Foreign Application Priority Data

Dec. 24, 1996 [JP] Japan .................................. 8-344056

[51] Int. Cl.[6] ..................................................... G11B 17/22
[52] U.S. Cl. ............................ 369/271; 369/75.2; 369/36
[58] Field of Search ................................. 369/75.1, 75.2, 369/77.1, 77.2, 264, 270, 271

[56] References Cited

U.S. PATENT DOCUMENTS 5,831,948 11/1998 Suzuki ..................................... 369/36
5,844,874 12/1998 Saito et al. ............................ 369/75.2

*Primary Examiner*—William J. Klimowicz
*Attorney, Agent, or Firm*—Weneroth, Lind & Ponack, L.L.P.

[57] ABSTRACT

A drive mechanism for moving a clamper arm into a standby position of the clamper is simplified and the possible occurrence of the vibration of the clamper in the standby state and the falling of the disc out of the tray in the transferring stage are prevented with a relatively simple construction. Provided is a disc clamping device having a turntable and a clamper which faces the turntable, operating to rotatively support a disc on the turntable with the disc pressed by the clamper, the device being provided with a clamper arm which rotatably supports the clamper and is able to pivot approximately in the direction of its axis of rotation, moving the clamper between a disc pressing position and a standby position, and a clamper arm moving means having a clamper urging plate which pivots the clamper arm as engaged with this and urges the clamper arm toward the turntable side at least in the disc pressing position, whereby the disc is urged against the turntable by the urging force of this clamper urging plate.

16 Claims, 13 Drawing Sheets ns such as CD (Compact Disc).

DISC CLAMPING DEVICE

BACKGROUND OF THE INVENTION

The present invention relates to a disc clamping device to be used for a disc which serves as a data recording medium such as CD (Compact Disc).

SUMMARY OF THE INVENTION

Conventionally, as a disc clamping device to be used for a disc which serves as a data recording medium such as CD, there has been a known one, taken as an example shown in FIGS. 12 and 13, having a rotatably provided turntable 112 and a clamper 117 arranged opposite to the turntable 112, whereby a disc 155 is loaded on the turntable 112 and the disc 155 is rotatably supported as pressed by the clamper 117.

It is to be noted that this prior art disc clamping device 120 shown in FIGS. 12 and 13 is applied to a disc changer provided with a plurality of trays 156, where the trays 156 are lodged in a magazine 150 as stacked at specified pitches with a disc 155 stored in a storage recess portion 156b on the upper surface thereof.

The turntable 112 is rotatively driven by a motor 113 (spindle motor) fixed to a base block 114 (traverse chassis). The clamper 117 is rotatably supported by an arm member 121 (clamper arm), and the clamper arm 121 has its one end pivotally supported at an end portion which belongs to the traverse chassis 114 and is located on the side opposite from the magazine. This pivot portion 121s is mounted with a spring member 128 (torsion coil spring), and the clamper arm 121 is urged by this torsion coil spring 128 in the counterclockwise direction in the figure.

When a selected tray 156 is drawn rightward in the figure and placed between the turntable 112 and the clamper 117, the clamper arm 121 pivots in the counterclockwise direction in the figure by the operation of a conventionally known clamper drive mechanism, thereby pressing the disc 155 placed on the turntable 112. In this stage, the disc 155 is pressed against the turntable 112 by the urging force of the torsion coil spring 128 and rotatively driven by the spindle motor 113 in this pressed state.

Furthermore, in a state in which no disc 155 is set, the clamper 117 is in a standby state as shown in the figure. In this state, for the purpose of preventing noises and the like from occurring due to the vibration of the clamper 117 by an external vibration input, the clamper arm 121 is mounted with a leaf spring 129 which urges the clamper 117 against the clamper arm 121 as clearly shown in FIG. 13. With this arrangement, the clamper 117 can be urged and pressed against the clamper arm 121, thereby allowing a clearance between both the members to be removed and preventing the possible occurrence of noises due to the external vibration input. For example, there are many opportunities for the occurrence of external vibration inputs in the case of a disc clamping device mounted on a vehicle such as an automobile, and therefore, a countermeasure against the vibration as described above is very important.

When moving the clamper 117 located in the disc pressing position into the standby position in the above disc clamping device 120, it is neccessary to pivot the clamper arm 121 in the clockwise direction in FIGS. 12 and 13 against the urging force of the torsion coil spring 128. Conventionally, due to the arrangement which the counterclockwise urging force of the torsion coil spring 128 is always exerted on the clamper arm 121, there has been the problem that a large force is required to move the clamper 117 into the standby position and accordingly a complicated large-scale mechanism results. Particularly, in the disc clamping device for on-board use in a vehicle having a limited mounting space, the above arrangement becomes a disadvantage in attempting to make the device more compact.

In connection with the mechanism for moving the clamper from the pressing position into the standby position, the present applicant has proposed a construction which is disclosed in Japanese Patent Application No. HEI 7-163482 and provided with a clamper arm separating member for separating the clamper arm from the turntable side against the urging force of the spring for the purpose of moving the clamper into the standby position. Also in this case, a separately provided member (clamper arm separating member) and a drive mechanism for driving this member are required for the purpose of separating the clamper arm.

In the prior art disc clamping device 120 shown in FIGS. 12 and 13, the leaf spring 129 is separately provided for urging the clamper 117 against the clamper arm 121 in order to prevent the possible occurrence of vibration in the standby position of the clamper 117, and this disadvantageously leads to an increased number of components.

Furthermore, for example, in the case where the disc 155 is displaced due to an external vibration input or the like while being transferred and it consequently falls out of the storage recess portion 156b of the tray 156 when the tray 156 is drawn out of the magazine 150 and transferred to a space between the turntable 112 and the clamper 117 or conversely sent back into the magazine 150, the disc 155 becomes stuck inside the device. This may disable the loading operation or the operation of sending the disc back into the magazine 150, possibly causing a trouble in the device. Therefore, it has been conventionally considered to mount a guide or a regulating member for preventing the disc from falling out of the tray to a required portion or similar measures. This arrangement has had the problem that an increased number of components results and troublesome mounting work and mounting space are required.

SUMMARY OF THE INVENTION

The present invention has been developed in view of the aforementioned technical problems, and its object is to provide a disc clamping device capable of simplifying the drive mechanism for moving the clamper arm into the standby position of the clamper and preventing the possible occurrence of the vibration of the clamper in the standby state and the falling of the disc out of the tray in the transferring stage with a relatively simple construction.

In order to achieve the aforementioned object, according to a first aspect of the present invention, there is provided a disc clamping device which has a rotatably provided turntable and a clamper arranged opposite to the turntable. The clamper operates to rotatably support a disc placed on the turntable while pressing the disc by means of the clamper, the disc clamping device comprising: a clamper arm which rotatably supports the clamper and is pivotally provided approximately in a direction of its axis of rotation, operating to move the clamper between a disc pressing position in which the clamper presses the disc on the turntable and a standby position in which the clamper is located apart from the disc; and a clamper arm moving means having an arm urging means for moving the clamper arm as engaged with the clamper arm and urging the clamper arm against the turntable at least in the disc pressing position. The disc is urged against the turntable in the disc pressing position of the clamper by an urging force exerted from the arm urging means.

Further, according to a second aspect of the present invention, based on the aforementioned first aspect of the present invention, a clamper regulating portion which abuts against the clamper when the clamper operates to move away from the turntable by a specified quantity is provided on a side opposite from the turntable beyond the clamper. Also, the clamper, when located in the clamper standby position is elastically urged against the clamper regulating portion by the arm urging means.

Furthermore, according to a third aspect of the present invention, based on the aforementioned first or second aspect of the present invention, the arm urging means is constructed so as to urge the disc against the turntable via the clamper arm when the clamper is located in the disc pressing position and release its urging force while the clamper arm is pivoting.

Furthermore, according to a fourth aspect of the present invention, based on any of the aforementioned first through third aspects of the invention, the clamper arm moving means has a control slider controlled to be driven in loading and unloading stages. The arm urging means is comprised of an elastically deformable plated-shaped which, the clamper urging plate has one end engaged with the clamper arm and has the other end arranged opposite to an urging plate operating portion formed at the control slider. The clamper urging plate is pivotally supported at a specified portion in the middle thereof, and the clamper arm is made to pivot via the clamper urging plate according to a slide operation of the control slider and the clamper is moved between the disc pressing position and the standby position.

Furthermore, according to a fifth aspect of the present invention, based on the aforementioned fourth aspect of the present invention, the urging plate operating portion formed at the control slider has a first operating portion which elastically urges the clamper to a side opposite to the turntable side in the standby position of the clamper, a second operating portion which urges the disc against the turntable in the disc pressing position and a guide portion which releases the urging force of the clamper urging plate as provided between both the operating portions.

Furthermore, according to a sixth aspect of the present invention, based on the aforementioned fourth or fifth aspect of the present invention, the control slider controls the movement of the clamper arm and controls the movement of the turntable into a position in which the disc can be placed.

According to a seventh aspect of the present invention, there is provided a disc clamping device having a rotatably provided turntable, a clapper arranged opposite to the turntable and a tray which can be moved toward a space between the turntable and the clamper with a disc retained on it and operates to rotatably support the disc moved by the tray on the turntable while pressing the disc by means of the clamper. The disc clamping device comprising: a clamper arm which rotatably supports the clamper and is pivotally provided approximately in a direction of its axis of rotation, operating to move the clamper between a disc pressing position in which the clamper presses the disc on the turntable and a standby position in which the clamper is located apart from the disc; a clamper arm moving means for pivotally moving the clamper arm as engaged with the clamper arm; and a tray regulating portion which constitutes a part of the clamper arm moving means and is able to regulate behavior of the tray in the direction of thickness, the tray regulating portion coming close to a peripheral portion of the tray when the clamper is located in the standby position and moving apart from the tray when the clamper is located in the disc pressing position.

Furthermore, according to an eighth aspect of the present invention, based on the aforementioned seventh aspect of the present invention, a gap between the tray regulating portion and the tray in a state in which the tray regulating portion comes close to the peripheral portion of the tray is set smaller than the thickness of the disc.

Furthermore, according to a ninth aspect of the present invention, based on the aforementioned seventh or eighth aspect of the present invention, the disc clamping device is assembled into a disc changer provided with a plurality of trays.

DETAILED DESCRIPTION OF THE PREFERRED EMBODIMENTS

A preferred embodiment of the present invention will be described in detail below with reference to the accompanying drawings taking a disc clamping device to be assembled into a disc changer for on-board use in a vehicle as an example.

Figure 1:
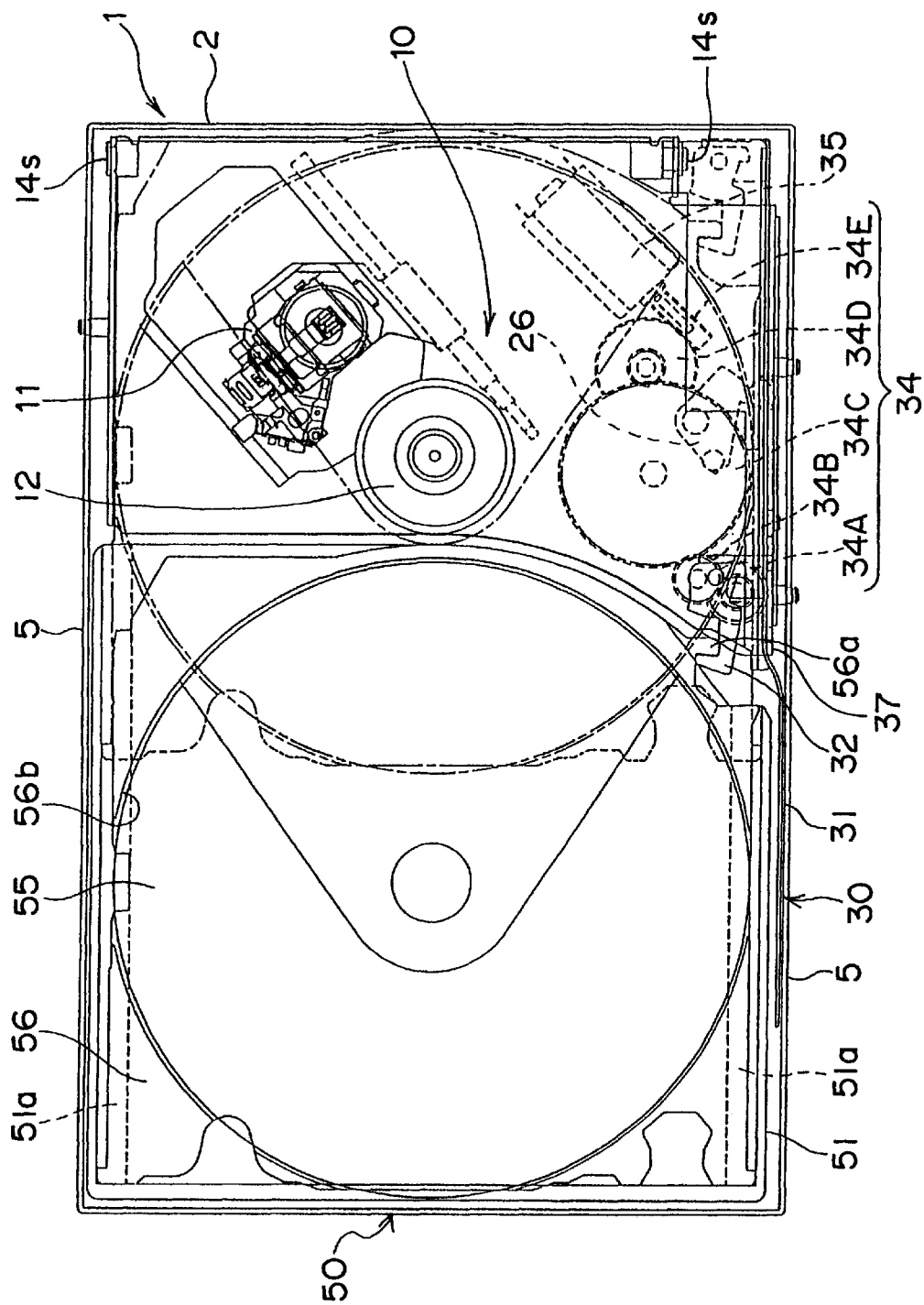
FIG. 1 is an explanatory plan view schematically showing the construction of a disc changer according to an embodiment of the present invention.
Figure 2:
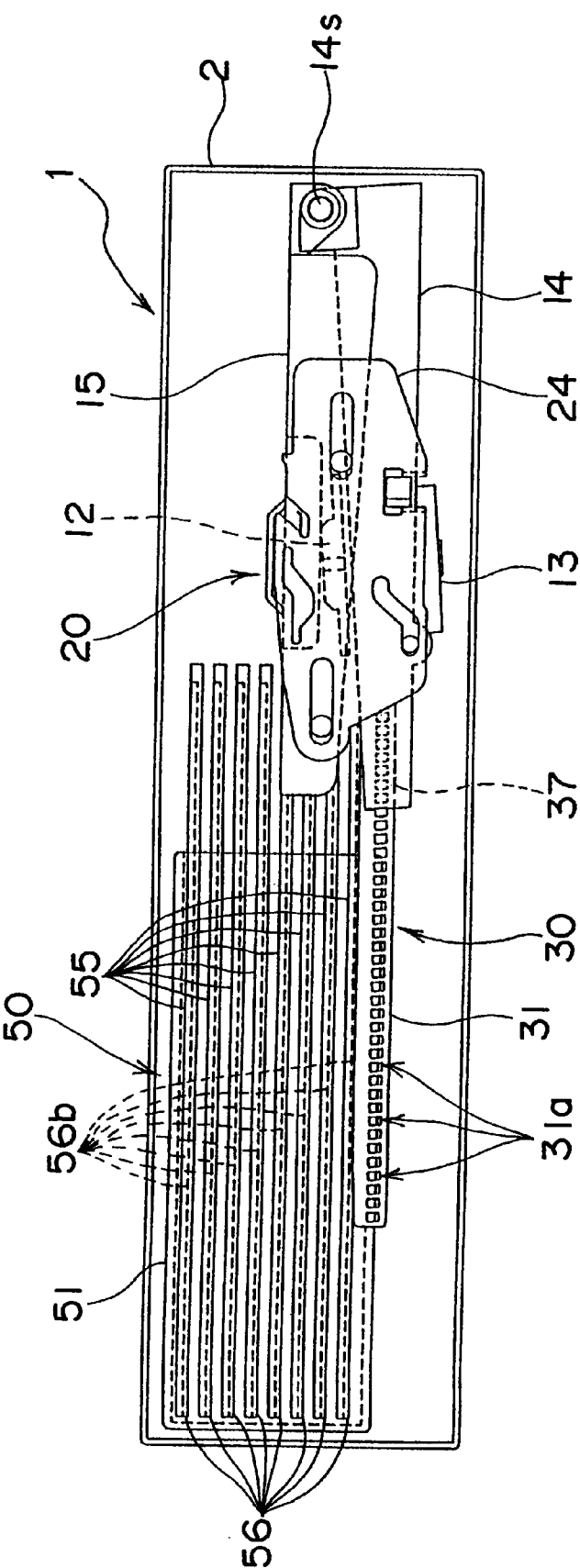
FIG. 2 is an explanatory side view of the above disc changer.

FIGS. 1 and 2 are explanatory plan view and an an explanatory side view schematically showing the construction of a disc changer 1 in which a disc clamping device according to an embodiment of the present invention is assembled. As shown in these figures, the disc changer 1 is provided with a recording and reproducing unit 10 which records information on a disc 55 and reproduces the information recorded on the disc 55 which serves as a data recording medium such as CD (Compact Disc) located in one side region inside a main body 2 constituting an approximately rectangular parallelepiped casing.

In a side region adjacent to this recording and reproducing unit 10 is mounted, for example, a dismountable magazine 50 for lodging therein the disc 55.

This magazine 50 has a magazine body 51 whose outer configuration is formed totally into an approximately rectangular parallelepiped shape. This magazine body 51 is preferably provided internally with a plurality of parallel frame portions 51a each for supporting a tray 56 for retaining a disc.

Then, by supporting the trays 56 by the frame portions 51a with respective discs 55 retained on storage recess portions 56b formed on the upper surfaces of the trays 56, a plurality of discs 55 are lodged in the magazine 50 and stacked at specified intervals.

On the other hand, the recording and reproducing unit 10 has a turntable 12 for rotating the disc 55 placed on it, a drive motor 13 (spindle motor, see FIG. 2) for rotatively driving the turntable 12, a disc clamping device 20 having a clamper 17 which is placed above oppositely to the turntable 12 and will be described later and a pickup section 11 which writes information on the disc 55 or reads the information recorded on the disc 55 that is rotated by the turntable 12. This pickup section 11 and the spindle motor 13 are both supported as fixed on a base block 14 (traverse chassis).

The recording and reproducing unit 10 has an upper plate 15 constituting its ceiling, while the traverse chassis 14 is pivotally supported on the upper plate 15 via a pair of pivot axes 14s.

Between the magazine 50 and the recording and reproducing unit 10 is provided a disc transporting unit 30 for transporting the disc 55 between both the members. The disc transporting unit 30 has at its one end an engagement arm 32 to be engaged with an engagement portion 56a provided at an end portion of the tray 56 as well as a belt-shaped transfer member 31 elongated in a disc transfer direction (lateral direction in FIGS. 1 and 2). This transfer member 31 is provided with a rack 31a extending in a direction in which the transfer member 31 extends (i.e., in the disc transfer direction).

The disc transporting unit 30 is provided with a gear mechanism 34 (34A through 34E) having a gear 34A to be meshed with this rack 31a and a drive motor 35 (loading motor) for driving the transfer member 31 in the disc transfer direction via this gear mechanism 34.

According to the present embodiment, the transfer member 31 is preferably formed of, for example, a synthetic resin of a relatively soft material, and it can be elastically deformed relatively easily in a direction perpendicular to the disc transfer direction although it is hard to deform in the disc transfer direction because of its shape. It is to be noted that the transfer member 31 can be made of, for example, a relatively hard rubber or a thin steel plate (having a thickness of, for example, about 0.1 to 0.2 mm) as a material for producing a similar effect.

Furthermore, according to the present embodiment, a guide section 37 for guiding this transfer member 31 in the disc transfer direction is preferably provided on the traverse chassis 14 of the recording and reproducing unit 10, and this guide section 37 is set so that its guide passage is located inside the outermost portion of the outer wall of the magazine body 51. When the transfer member 31 is sent to the magazine 50 side, the transfer member 31 is once directed obliquely outwardly and then sent to the magazine 50 side along a side plate 5 of the disc changer body 2.

When transferring the disc 55 and the tray 56 lodged in the magazine 50 to the recording and reproducing unit 10 side with the construction as described above, the drive motor 35 is rotated in a specified direction, thereby rotatively driving the gear mechanism 34 (34A through 34E). By this operation, the rack 31a meshed with the gear 34A is sent rightward in the figure (i.e., to the recording and reproducing unit 10 side), so that the transfer member 31 having the engagement arm 32 at its right-hand end is moved rightward.

The tray 56, which is engaged with the engagement arm 32 by its engagement portion 56a, is drawn rightward in accordance with the movement of the transfer member 31 and transferred until, for example, the engagement arm 32 abuts against the wall surface of the disk changer 1. Then, in a state in which the transfer is stopped, the disc 55 is loaded on the turntable 12.

Conversely, when sending the disc 55 loaded on the turntable 12 back into the magazine 50 for the lodging of the disc, the loading motor 35 is rotated in the reverse direction, thereby allowing the disc 55 and the tray 56 to be transferred leftward in the figure (i.e., to the magazine 50 side) in contrast to the aforementioned case.

The disc clamping device 20 assembled into the disk changer 1 will be described next.

Figure 3:
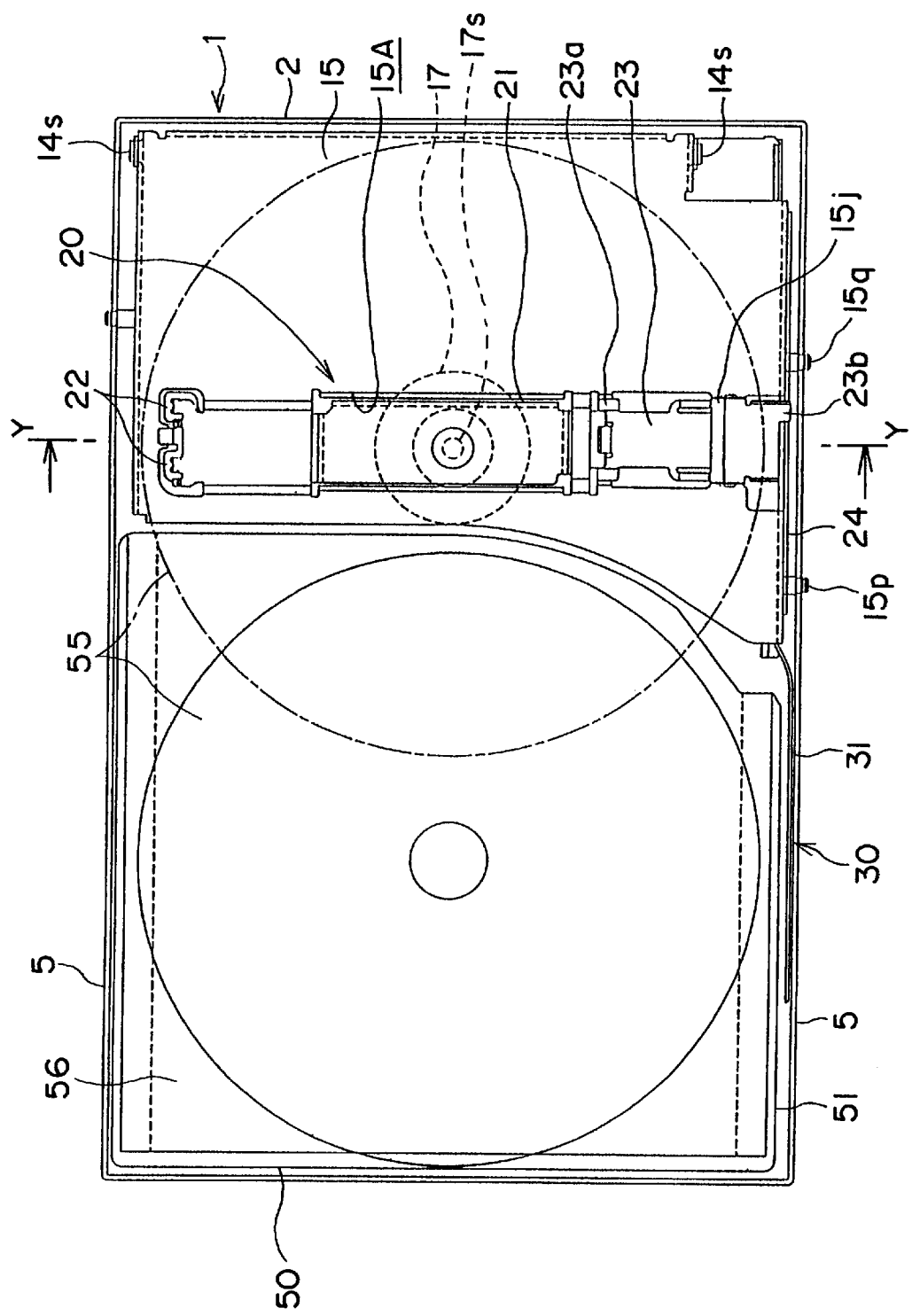
FIG. 3 is an explanatory plan view showing a disc clamping device in a disc changer.
Figure 4:
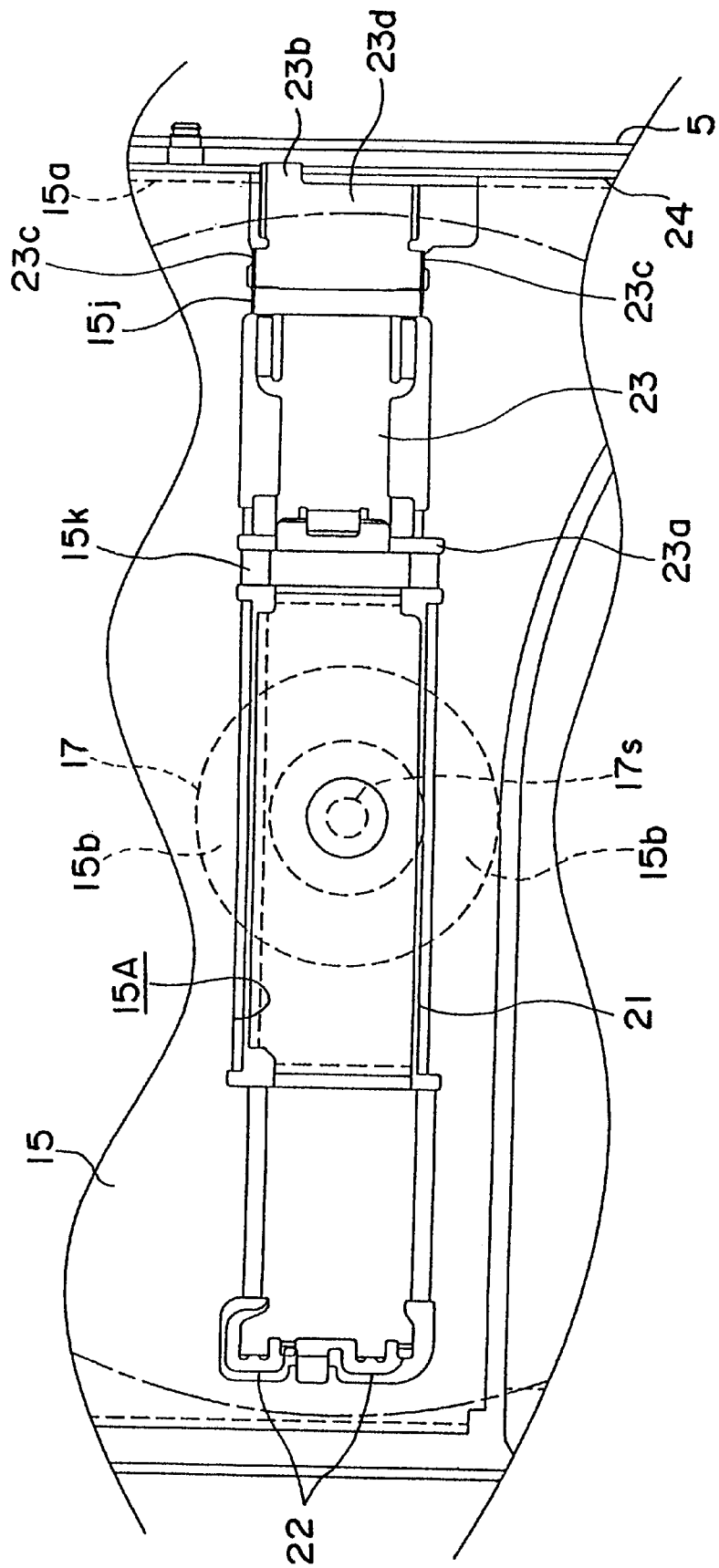
FIG. 4 is an enlarged explanatory plan view of an essential part of the disc clamping device shown in FIG. 3.

According to the present embodiment, as shown in FIG. 3, for the purpose of pivotally supporting the clamper 17 arranged above oppositely to the turntable 12, an arm member 21 (clamper arm) is mounted on the upper plate 15 so as to extend in a direction perpendicular to a tray transfer direction. As clearly shown in FIGS. 7 and 10, the clamper arm 21 is formed into a plate having specified width, length and thickness and has its one end pivotally supported at a fulcrum portion 22 provided at the upper plate 15 as also shown in detail in FIG. 4. The clamper arm 21 is located so that it faces a rectangular opening section 15A formed at the upper plate 15 and is able to pivot in the vertical direction around the fulcrum portion 22 (i.e., approximately in a direction in which a rotary shaft 17s of the clamper 17 extends), thereby allowing the clamper 17 to be moved between a disc pressing position (see FIGS. 10 and 11) in which the disc 55 on the turntable 12 is pressed and a standby position (see FIGS. 7 and 8) located apart from the turntable 12 side.

The clamper arm 21 has the other end engaged with one end portion 23a of a plate-shaped clamper urging plate 23 which serves as an arm urging means for urging the clamper arm 21 toward the turntable 12 side at least in the disc pressing position. The clamper urging plate 23 is constructed of a leaf spring having a specified elastic characteristic and has the other end portion 23b engaged with an oppositely arranged urging plate operating portion 25 of a control slider 24 which is provided slidably along a side surface of the traverse chassis 14 as shown in FIGS. 6 and 9.

Then, a hook portion 23c formed in the middle of the clamper urging plate 23 is pivotally supported as engaged with a first cross bar 15j provided as extended over an appropriate portion of the rectangular opening section 15A of the upper plate 15. Therefore, the clamper arm 21 is made to pivot so as to move the clamper 17 between the disc pressing position and the standby position around the fulcrum portion 22 by a pivoting operation of this clamper urging plate 23.

On the outside (on the right-hand side in FIG. 4) of the hook portion 23c of the clamper urging plate 23 is provided a bent portion 23d formed by bending upward the edge portions of both sides. It is to be noted that a second cross bar 15k formed at the rectangular opening section 15A of the upper plate 15 is placed adjacently above the engagement section of the clamper arm 21 and the clamper urging plate 23.

Figure 6:
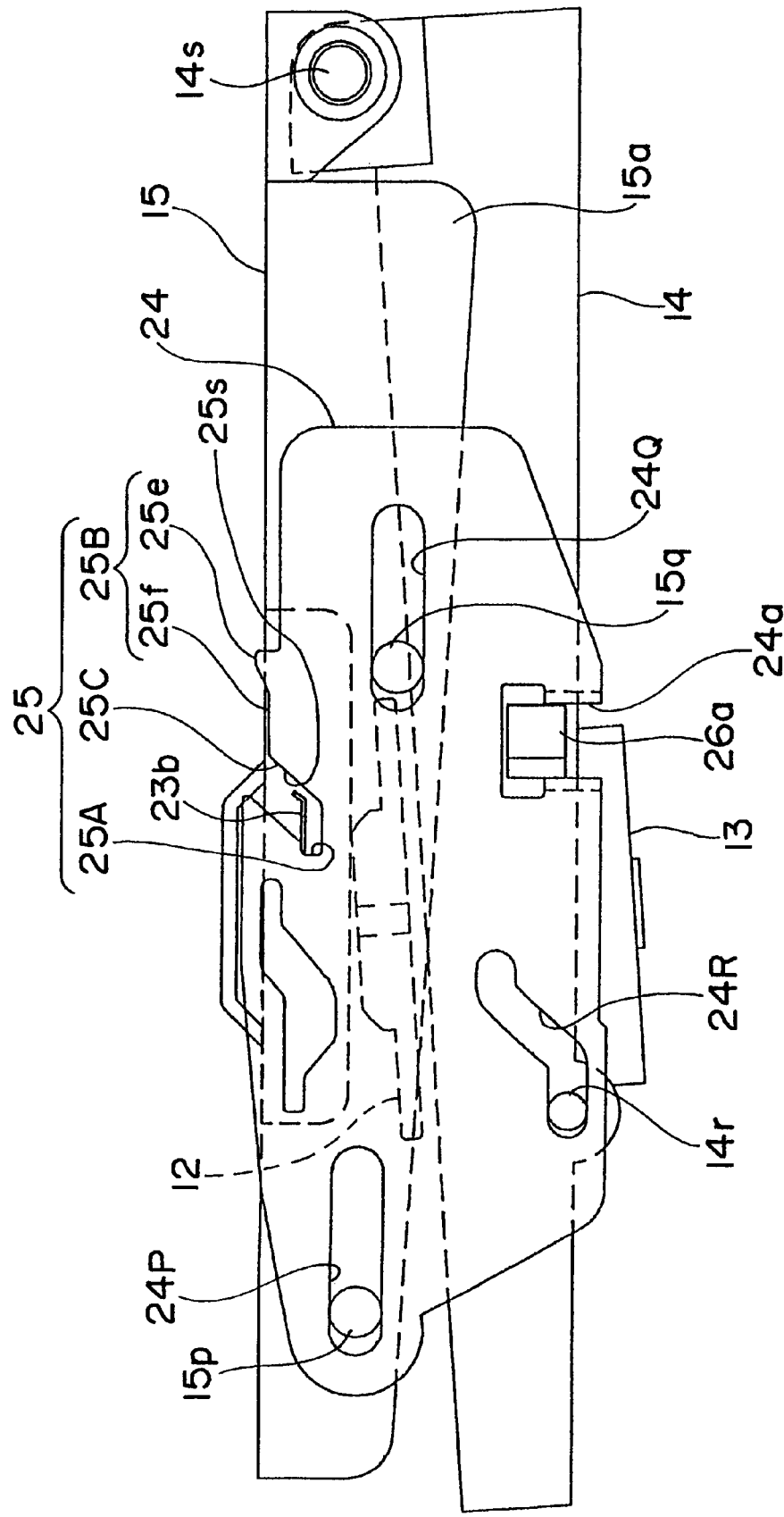
FIG. 6 is an explanatory side view showing a disc loading enabled state of the above disc clamping device.
Figure 9:
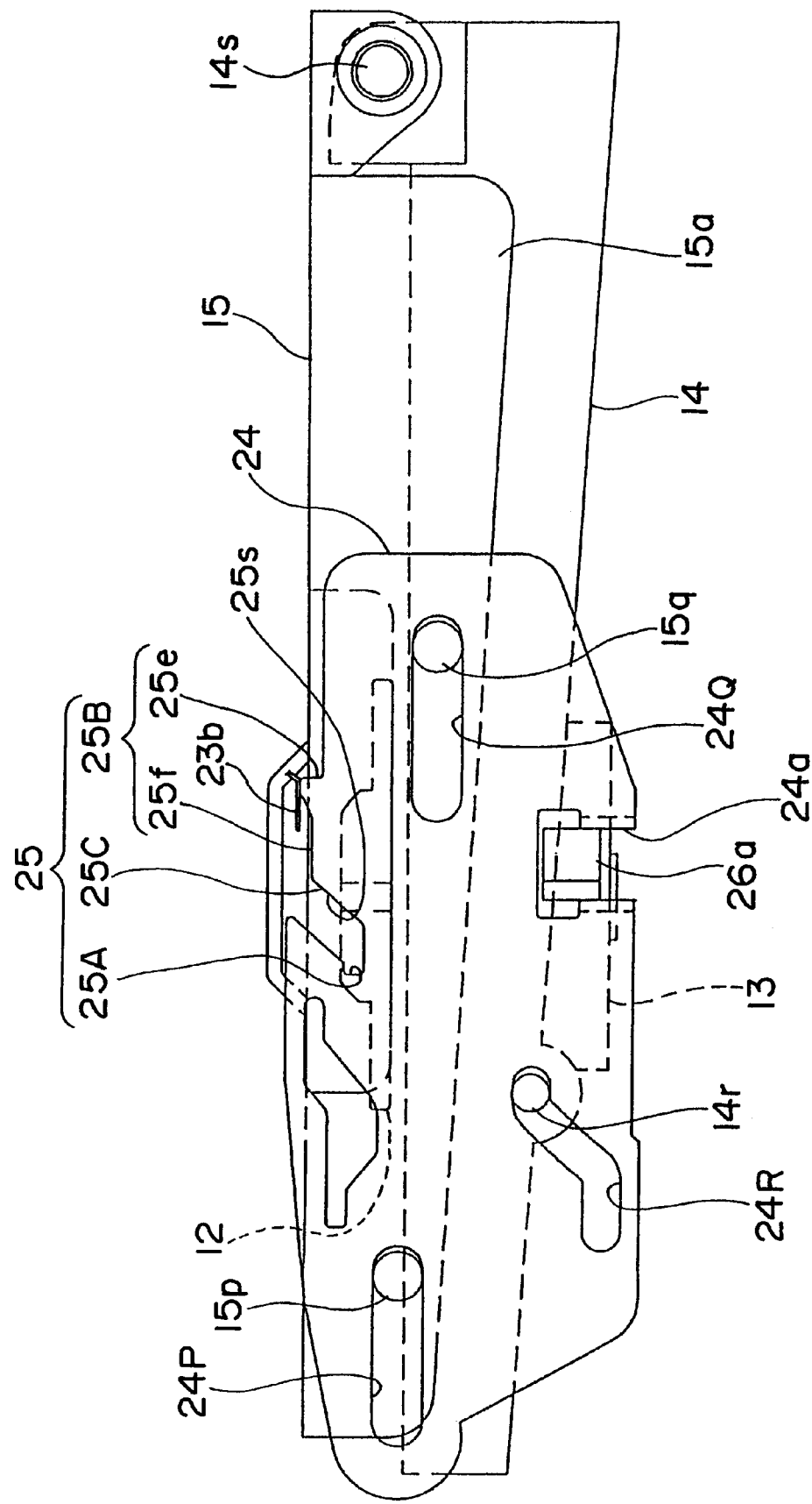
FIG. 9 is an explanatory side view showing a disc pressing state of the above disc clamping device.

The control slider 24 is formed of a plate having a specified thickness and is provided with guide grooves 24P and 24Q to be engaged with projection pins 15p and 15q fixed to a plate side portion 15a formed by bending downward a side portion of the upper plate 15 as well as a guide groove 24R to be engaged with a fixed pin 14r provided in a projecting form on a side surface of the traverse chassis 14 (see FIGS. 6 and 9).

Figure 5:
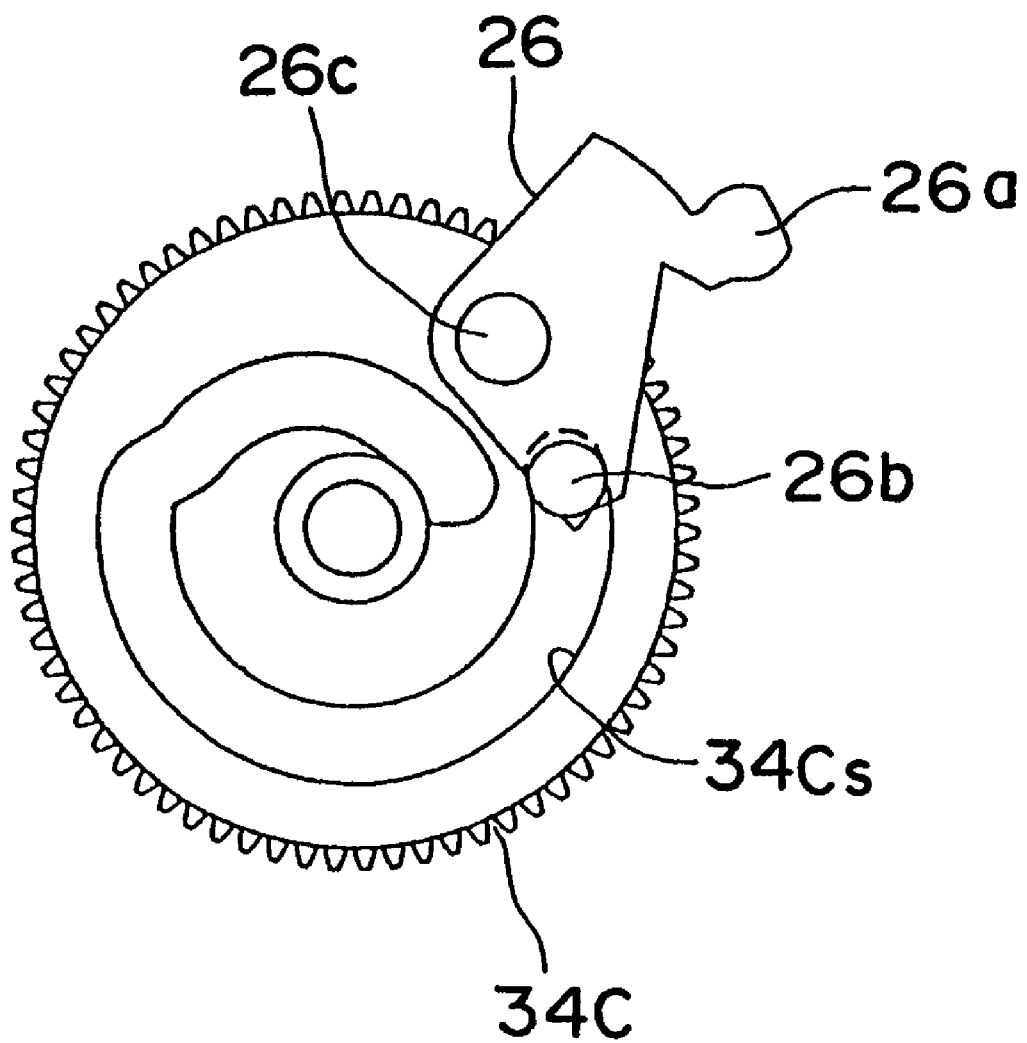
FIG. 5 is a bottom view of a large-diameter gear and a control arm provided in the disc changer.

At a lower portion of the control slider 24 is provided a cutaway portion 24a, and the cutaway portion 24a is engaged with a pawl portion 26a of a control arm 26 which swings in accordance with the pivoting of a large-diameter gear 34C of the gear mechanism 34 of the disc transporting unit 30 so as to drive the slider 24. As clearly shown in FIG. 5, the control arm 26 has its boss portion 26b engaged with, for example, a cam groove 34Cs formed on the rear surface side of the large-diameter gear 34C. With the rotation of the large-diameter gear 34C, the control arm 26 swings within a specified range around a fulcrum portion 26c, in accordance with which the control slider 24 is moved by the pawl portion 26a so as to be driven in the lateral direction in the figure along the side surface of the traverse chassis 14.

Further, as clearly shown in FIGS. 6 and 9, the urging plate operating portion 25 for the engagement with the other end portion 23b of the clamper urging plate 23 is formed at an upper portion of the control slider 24. The urging plate operating portion 25 is constructed of a first operating portion 25A comprised of a bottom portion of an inclined groove 25s and its vicinities, a second operating portion 25B comprised of an upper flat portion 25f and a projecting portion 25e and a guide portion 25C which is comprised of the middle portion of the inclined groove 25s and connects both the operating portions 25A and 25B. According to the slide position of the control slider 24, the engagement position of the other end portion 23b of the clamper urging plate 23 with the urging plate operating portion 25 is varied.

The second operating portion 25B may be formed wholly into a shape inclined at a specified angle instead of being formed so that the projecting portion 25e and the upper flat portion 25f are continuous. In this case, it is possible to provide a setting such that the urging force disappears in the middle of the inclination.

In the construction as described above, when the loading motor 35 of the disc transporting unit 30 is driven, the gear mechanism 34 operates to slide the transfer member 31 and draw the tray 56 rightward in FIGS. 1 and 3. Subsequently, when the tray 56 is drawn out to a position in which the disc 55 comes into the position indicated by the one-dot chain lines in FIGS. 1 and 3, an engagement between a gear 34B and the large-diameter gear 34C is disengaged, thereby stopping the tray 56 although not illustrated. When the loading motor 35 further rotates, the large-diameter gear 34C continues to rotate in the counterclockwise direction in FIG. 1, and the control arm 26 is made to pivot in the clockwise direction in FIG. 1 around the fulcrum portion 26c by the cam groove 34Cs. By this operation, the control slider 24 that is engaged with the pawl portion 26a of the control arm 26 via the cutaway portion 24a is driven leftward in FIG. 1.

Figure 10:
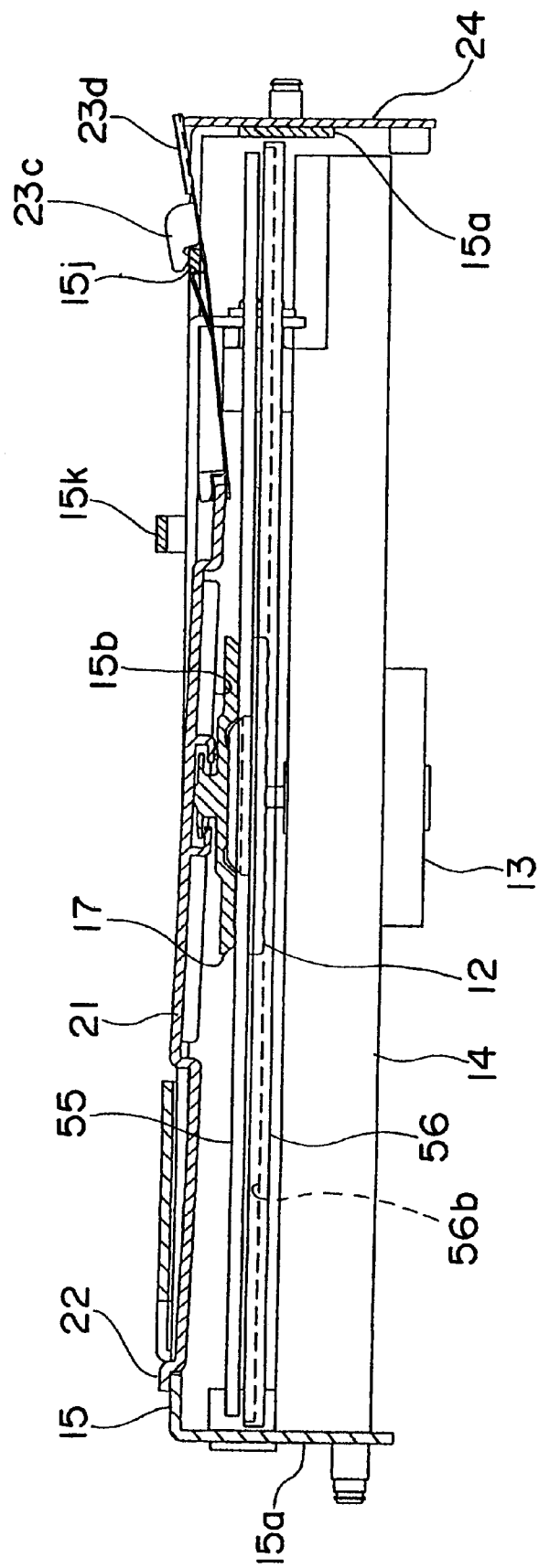
FIG. 10 is an explanatory view of a longitudinal section taken along the line X—X in FIG. 3 showing the disc pressing state of the above disc clamping device.
Figure 11:
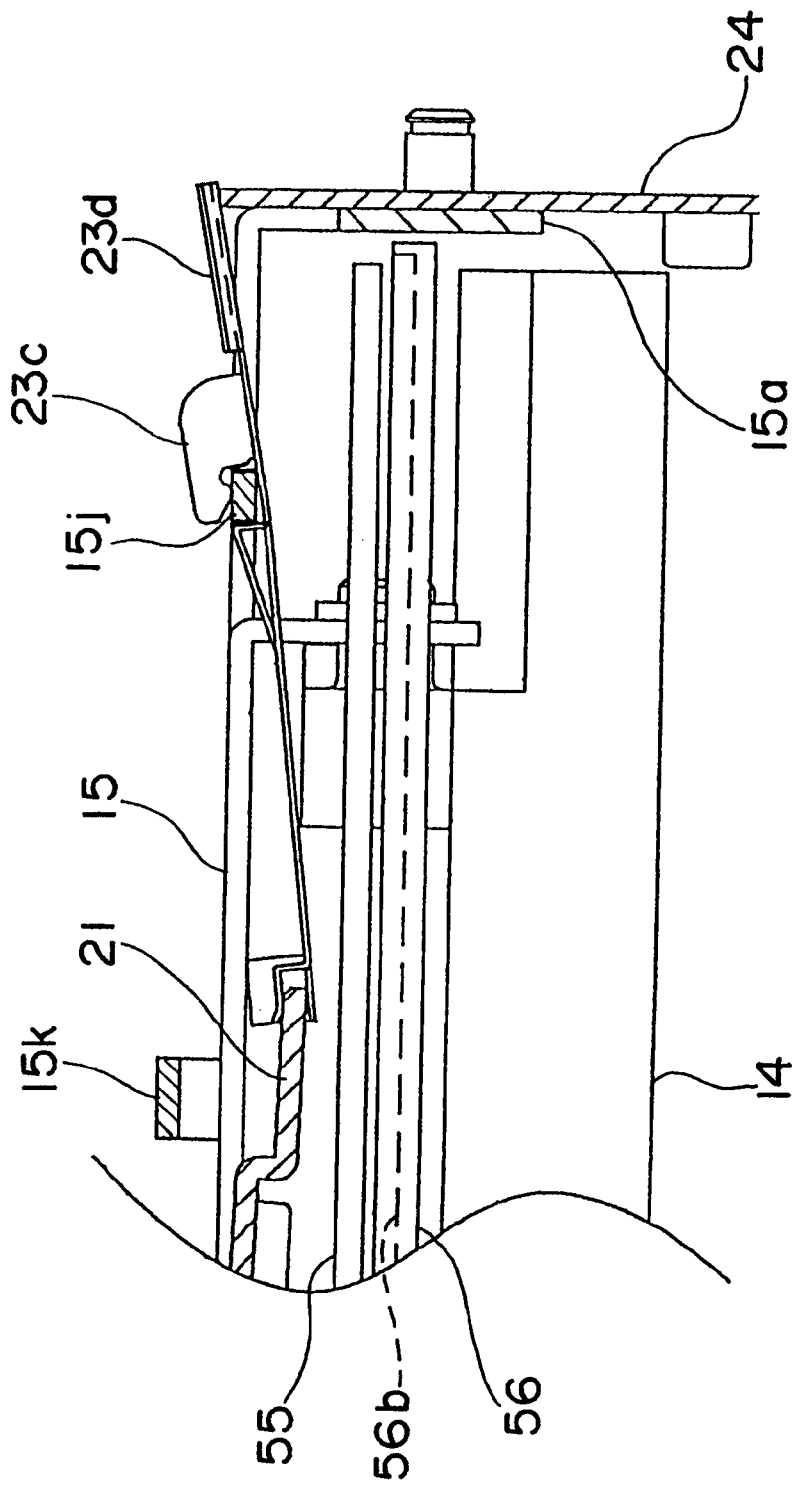
FIG. 11 is an enlarged view of an essential part of FIG. 10.
Figure 12:
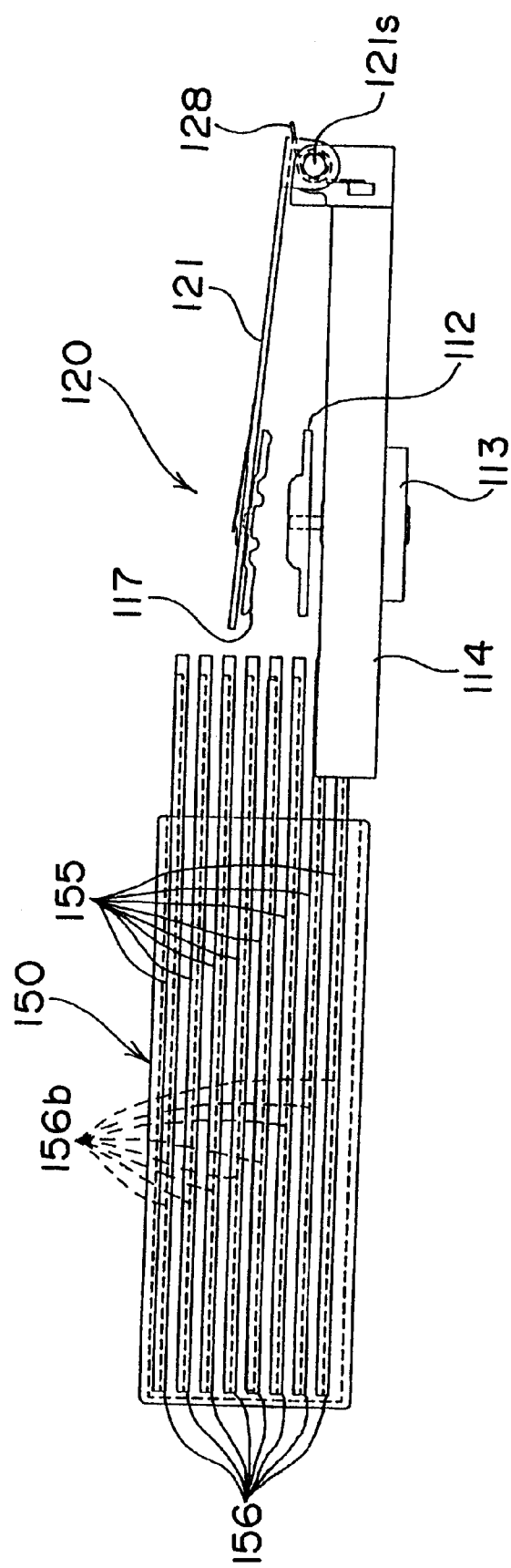
FIG. 12 is an explanatory side view schematically showing the construction of a disc clamping device and a disc magazine according to a prior art.
Figure 13:
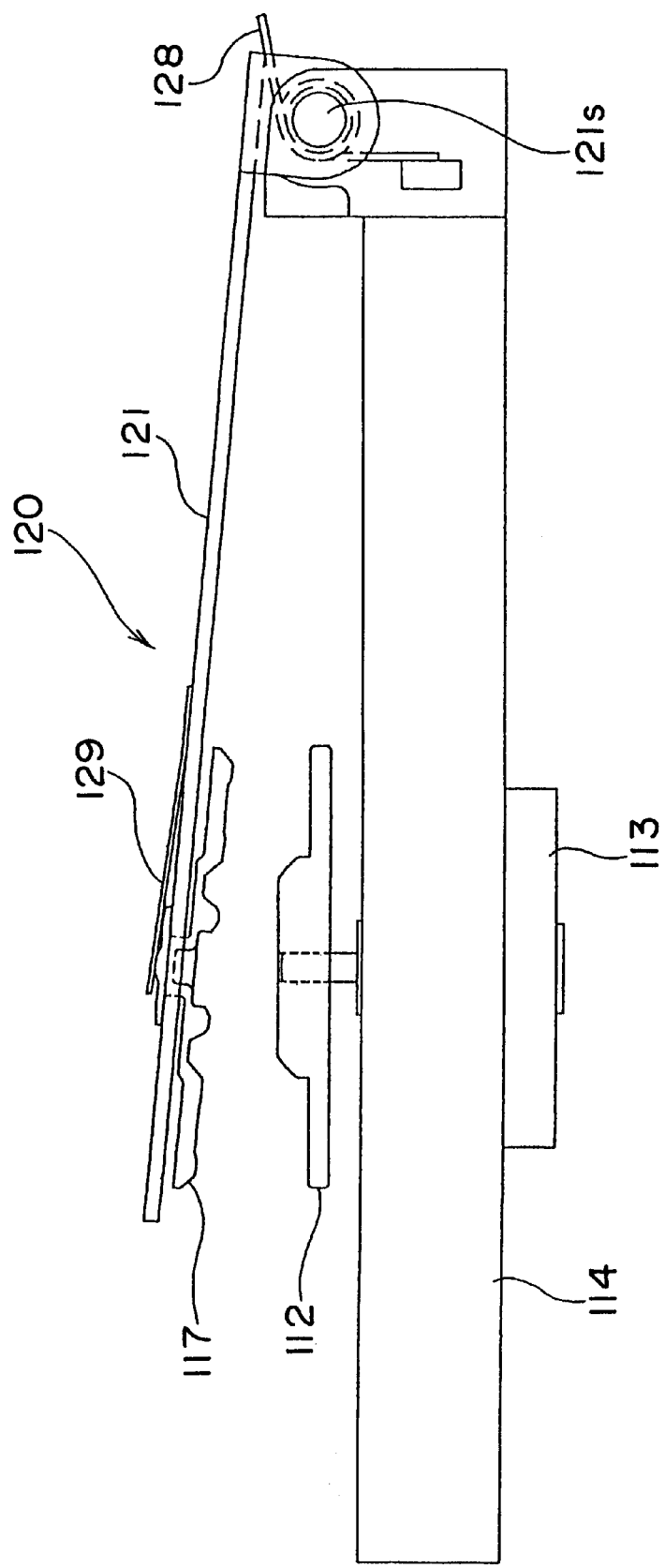
FIG. 13 is an enlarged explanatory side view of the disc clamping device of the above prior art.

As shown in FIGS. 9 through 11, according to the movement of this control slider 24, the other end portion 23b of the clamper urging plate 23 engaged with the urging plate operating portion 25 is pushed upward by the upper flat portion 25f of the second operating portion 25B of the urging plate operating portion 25, so that the clamper urging plate 23 pivots around the hook portion 23c in a manner that its bent portion 23d moves upward aslant. With this pivoting, the clamper arm 21 has the other end (right-hand end in FIGS. 10 and 11) pressed downward to pivot in the clockwise direction in FIGS. 10 and 11 around the fulcrum portion 22. By this operation, the clamper 17 is also pressed downward.

On the other hand, according to the movement of the control slider 24, the fixed pin 14r of the traverse chassis 14 engaged with the guide groove 24R is pushed upward, and the traverse chassis 14 pivots in the clockwise direction in FIG. 9 around the pivot axes 14s. By this operation, the disc 55 placed on the tray 56 that has been drawn to the loading position is held by the turntable 12 and the clamper 17.

After the clamper 17 abuts against the disc 55, the other end portion 23b of the clamper urging plate 23 is further pushed upward riding on the projecting portion 25e of the second operating portion 25B, and the clamper urging plate 23 made of an elastic material is elastically deformed to make its elastic force operate as a clamping pressure against the disc 55. That is, according to the present embodiment, the other end portion 23b of the clamper urging plate 23 is pushed upward riding on the projecting portion 25e of the second operating portion 25B, thereby obtaining the final clamping pressure.

In this case, the maximum (final) clamping pressure is effected only when the other end portion 23b of the clamper urging plate 23 is riding on the projecting portion 25e of the second operating portion 25B, and therefore, the clamper arm 21 is required to exert a great force only in the initial stage of the movement in moving the clamper 17 from the disc pressing state into the standby state. Therefore, no special large-scale mechanism is required for the movement, allowing the thickness of the control slider 24 to be set to a relatively thin thickness.

Figure 7:
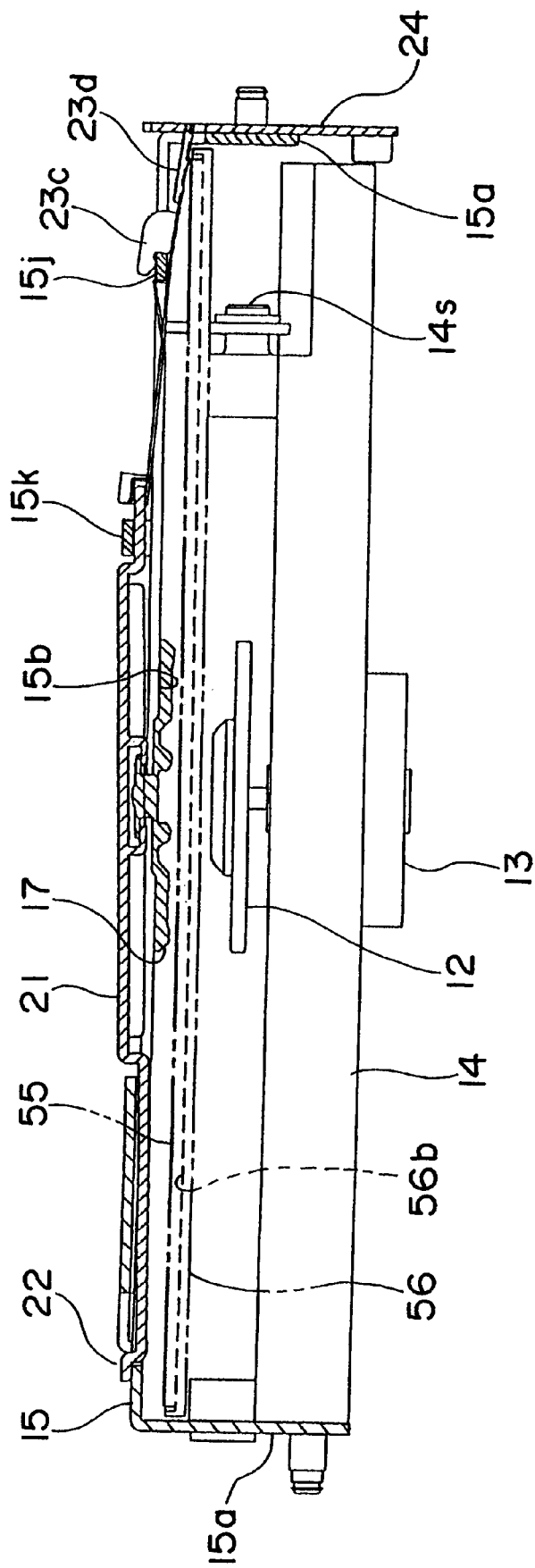
FIG. 7 is an explanatory view of a longitudinal section taken along the line Y—Y in FIG. 3 showing the disc loading enabled state of the above disc clamping device.
Figure 8:
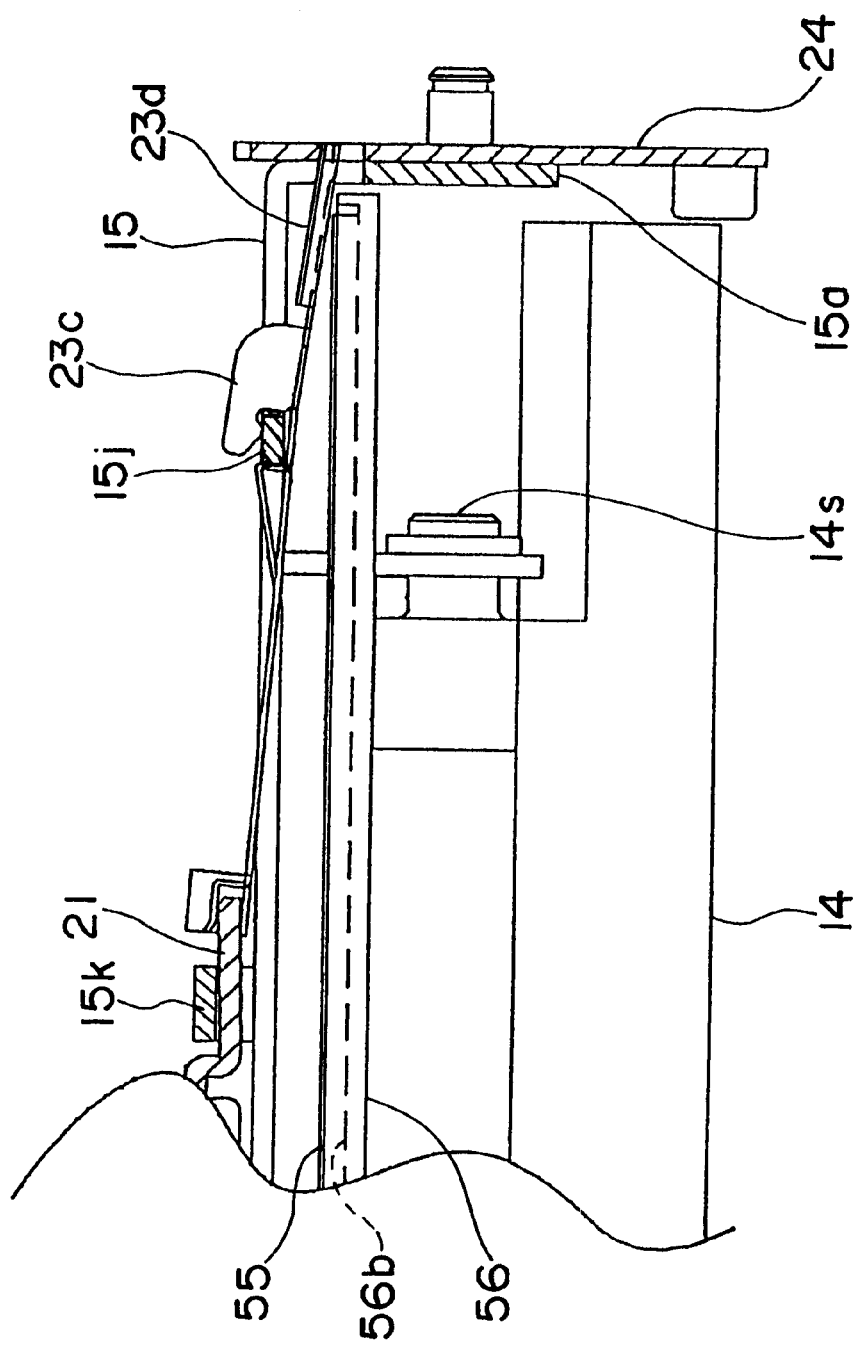
FIG. 8 is an enlarged view of an essential part of FIG. 7.

Next, when separating the clamper 17 from the disc 55, an operation reverse to the aforementioned operation is executed. With the rotation of the loading motor 35 in the reverse direction, the large-diameter gear 34C rotates in the clockwise direction in FIG. 1, and the control arm 26 pivots in the counterclockwise direction, thereby moving the control slider 24 rightward in FIG. 1. Consequently, as shown in FIGS. 6 through 8, the other end portion 23b of the clamper urging plate 23 is moved downward as it shifts from the second operating portion 25B to the guide portion 25C of the urging plate operating portion 25, by which the bent portion 23d of the clamper urging plate 23 is made to pivot downward aslant around the hook portion 23c. By this pivoting, the clamper arm 21 has the other end (right-hand end in FIGS. 7 and 8) pushed upward, so that the clamper arm 21 pivots in the counterclockwise direction in FIGS. 7 and 8 around the fulcrum portion 22. By this operation, the clamper 17 moves upward to move away from the turntable 12 side. It is to be noted that the urging force of the clamper urging plate 23 is released in the state in which the other end portion 23b of the clamper urging plate 23 is engaged with the guide portion 25C of the urging plate operating portion 25. This clamper 17 is set so that its upper surface abuts against a portion 15b corresponding to the clamper 17 on the lower surface side of the upper plate 15 so as to stop its upward movement when it is located a specified quantity apart from the turntable 12 side.

That is, the portion 15b corresponding to the clamper 17 on the lower surface side of the upper plate 15 corresponds to the clamper regulating portion as stated in the claims of the present application.

After the upper surface of the clamper 17 abuts against the lower surface side (clamper regulating portion 15b) of the upper plate 15, the other end portion 23b of the clamper urging plate 23 is further moved downward as it shifts from the guide portion 25C of the urging plate operating portion 25 to the first operating portion 25A, the clamper urging plate 23 made of an elastic material is elastically deformed, and the upper surface of the clamper 17 is pressed against the lower surface side of the clamper arm 21 by the elastic force without any gap. Thus, the clamper 17 located in the clamper standby position is elastically urged against the portion 15b by the clamper urging plate 23, and therefore, the clamper 17 located in the standby position can be prevented from vibrating without providing any separate elastic member in contrast to the prior arts arrangements.

In this stage, the bent portion 23d of the clamper urging plate 23, of which the outside (the right-hand side in FIGS. 7 and 8) is pressed downward aslant, enters into a state in which it comes close to the peripheral portion of the tray 56 in the disc loading stage. According to the present embodiment, the interval between the peripheral portion of the tray 56 and the bent portion 23d is made smaller than the thickness of the disc 55 in this state in which they are put close to each other. On the other hand, when the clamper 17 is in the disc pressing position, the bent portion 23d of the clamper urging plate 23, of which the outside (the right-hand side in the figure) is pushed upward aslant as clearly shown in FIGS. 10 and 11, is in a state in which it is sufficiently located apart from the peripheral portion of the tray 56 to the extent to which the rotation of the disc 55 is not hindered. That is, the bent portion 23d corresponds to the tray regulating portion.

As described above, the tray regulating portion 23d capable of regulating the behavior of the tray 56 in the direction of thickness is provided, and the tray regulating portion 23d comes close to the peripheral portion of the tray 56 when the clamper 17 is located in the standby position and moves away from the tray 56 when the clamper 17 is located in the disc pressing position. With this arrangement, the behavior of the tray 56 in the direction of thickness can be regulated while the disc 55 and the tray 56 are transferred without providing any separate member.

In particular, the interval between the tray regulating portion 23d and the peripheral portion of the tray 56 is made smaller than the thickness of the disc 55 in the state in which they are put close to each other. With this arrangement, the disc 55 can be infallibly prevented from falling out of the tray 56 while the disc 55 and the tray 56 are transferred.

The provision of the tray regulating portion 23d is very effective in preventing the possible occurrence of troubles due to the falling of the disc 55 out of the tray 56 in the disc changing stage of the disk changer 1 where disc changing is frequently performed.

It is to be noted that the present invention is not limited to the aforementioned embodiment, and it is a matter of course that various improvements and alterations in design can be effected within the scope of the essence of the present invention. Furthermore, the present invention can be applied not only to a disc changer for on-board use in a vehicle but also to a disc changer for general home use in audio equipment. Furthermore, the present invention can be effectively applied not only to assemblies in disc changers but also to other disc clamping devices.

According to the first aspect of the present invention, the clamper arm moving means having an arm urging means for pivoting the clamper arm in an engaged state and urging the clamper arm against the turntable at least in the disc pressing position is provided, and the disc is urged against the turntable in the disc pressing position of the clamper by the urging force of the arm urging means. With this arrangement, by adjusting the state of engagement between the arm urging means and the clamper arm, the clamper arm and the urging force exerted on the clamper can be changed between the clamper standby position and the disc pressing position. Therefore, the movement of the clamper from the disc pressing position into the standby position and the prevention of vibration in the standby position of the clamper can be achieved without providing any separate member in contrast to the prior art arrangement.

Further, according to the second aspect of the present application, basically an effect similar to that of the aforementioned first aspect of the present invention can be produced. Particularly, in the aforementioned first inventive aspect, the clamper regulating portion which abuts against the clamper when the clamper operates to move away by a specified quantity to the side opposite from the turntable beyond the clamper is provided, and the clamper located in the clamper standby position is elastically urged against the clamper regulating portion by the arm urging means. With this arrangement, the clamper located in the standby position can be prevented from vibrating without providing any separate elastic material in contrast to the prior art arrangement.

Furthermore, according to the third aspect of the present invention, basically an effect similar to that of the aforementioned first or second aspect of the present invention can be produced. In particular, the arm urging means is constructed so as to urge the disc against the turntable via the clamper arm when the clamper is located in the disc pressing position and release its urging force while the clamper arm is pivoting. With this arrangement, the operating force in moving the clamper from the disc pressing position into the standby position can be remarkably reduced, thereby obviating the need for the conventional large-scale construction such as the provision of separate components, allowing the device to be lighter and more compact and allowing the construction there of to be simplified.

Furthermore, according to the fourth aspect of the present invention, basically an effect similar to that of any of the aforementioned first through third aspects of the present invention can be produced. In particular, the clamper arm moving means has a control slider that is controlled to be driven in the loading and unloading stages and the arm urging means is constructed of an elastically deformable plated-shaped clamper urging plate. The clamper urging plate has one end engaged with the clamper arm and has the other end arranged opposite to the urging plate operating portion formed at the control slider. Further, the clamper urging plate is pivotally supported at the specified portion in the middle thereof, so that the clamper arm is made to pivot via the clamper urging plate according to the slide operation of the control slider and the clamper is moved between the disc pressing position and the standby position. With this arrangement, the clamper urging plate can be made to pivot according to the operation of the control slider, so that the state of engagement between the clamper urging plate and the clamper arm can be infallibly adjusted.

Furthermore, according to the fifth aspect of the present invention, basically an effect similar to that of the aforementioned fourth aspect of the present invention can be produced. In particular, the urging plate operating portion formed at the control slider has the first operating portion which elastically urges the clamper toward the side opposite to the turntable side in the standby position of the clamper, the second operating portion which urges the disc against the turntable in the disc pressing position, and the guide portion which releases the urging force of the clamper urging plate as provided between both the operating portions. With this arrangement, by driving the control slider for the adjustment of the engagement between the other end of the clamper urging plate and the urging plate operating portion, the state of the urging forces exerted on the clamper arm and the clamper can be infallibly changed.

Furthermore, according to the sixth aspect of the present invention, basically an effect similar to that of the aforementioned fourth or fifth aspect of the present invention can be produced. And also, the control slider controls the movement of the clamper arm and controls the movement of the turntable into the position in which the disc can be loaded. With this arrangement, the movement control of the clamper arm and the movement control of the turntable can be concurrently achieved by one member, so that the construction of the device and the simplification of the operation can be achieved.

According to the seventh aspect of the present invention, the tray regulating portion which constitutes a part of the clamper arm moving means and is able to regulate the behavior of the tray in the direction of thickness is provided, and the tray regulating portion comes close to the peripheral portion of the tray when the clamper is located in the standby position and moves away from the tray when the clamper is located in the disc pressing position. With this arrangement, the behavior of the tray in the direction of thickness while the disc and the tray are transferred can be regulated without providing any separate member.

Furthermore, according to the eighth aspect of the present invention, basically an effect similar to that of the aforementioned seventh aspect of the present invention can be produced. In particular, the gap between the tray regulating portion and the tray in the state in which the tray regulating portion comes close to the peripheral portion of the tray is set smaller than the thickness of the disc. With this arrangement, the disc can be infallibly prevented from falling out of the tray while the disc and the tray are transferred.

Furthermore, according to the ninth aspect of the present invention, basically an effect similar to that of the aforementioned seventh or eighth aspect of the present invention can be produced. And also, the above disc clamping device is assembled into a disc changer provided with a plurality of trays, and therefore, an effect can be produced to prevent the possible occurrence of trouble due to the falling of the disc out of the tray in the disc changing stage of the disk changer where disc changing is frequently performed.

What is claimed is:

1. A disc clamping device comprising:

a turntable for supporting a disc;

a clamper for pressing the disc supported on said turntable, said clamper being arranged opposite to said turntable and having an axis of rotation;

a clamper arm rotatably supporting said clamper, said clamper arm being pivotal approximately in a direction of the axis of rotation of said clamper, wherein said clamper arm is operable to move said clamper between a disc pressing position, in which said clamper presses the disc on said turntable, and a standby position in which said clamper is located apart from the disc; and a clamper arm moving means for moving said clamper arm, said clamper arm having an arm urging means for urging said clamper arm against said turntable at least in the disc pressing position, wherein:

said arm urging means, in the disc pressing position of said clamper, exerts an urging force on the disc in order to press the disc against said turntable;

said arm urging means comprises an elastically deformable clamper urging plate, and said clamper arm moving means includes a control slider which can be controlled so as to be driven in disc loading and disc unloading stages, said control slider has an urging plate operating portion;

said clamper urging plate has a first end in engagement with said clamper arm, and a second end in engagement with said urging plate operating portion;

said clamper urging plate is pivotally supported at a specified portion in the middle of said urging plate operating portion; and said clamper arm is arranged so as to pivot via said clamper urging plate to move said clamper between the pressing position and the standby position in accordance with a slide operation position of said control slider.

2. A disc clamping device as claimed in claim 1, wherein said urging plate operating portion comprises:

a first operating portion for operating said clamper urging plate so that it elastically urges said clamper toward a side opposite to the turntable side in the standby position of the clamper;

a second operating portion for operating said clamper urging plate so that it elastically urges the disc against said turntable in the pressing position; and a guide portion, connecting said first and second operating portions, for releasing the urging force of said clamper urging plate.

3. A disc clamping device as claimed in claim 2, wherein said control slider controls the movement of said clamper arm and controls the movement of said turntable to a position in which the disc can be placed thereon.

4. A disc clamping device as claimed in claim 1, wherein said control slider controls the movement of said clamper arm and controls the movement of said turntable to a position in which the disc can be placed thereon.

5. A disc clamping device as claimed in claim 1, further comprising:

a clamper regulating portion abutting against said clamper when said clamper operates to move away from said turntable by a specified distance, said clamper regulating portion being disposed on a side opposite from said turntable beyond said clamper, and said clamper, when located in the standby position, is elastically urged against said clamper regulating portion by said arm urging means.

6. A disc clamping device as claimed in claim 5, wherein said urging plate operating portion comprises:

a first operating portion for operating said clamper urging plate so that it elastically urges said clamper toward a side opposite to the turntable side in the standby position of the clamper;

a second operating portion for operating said clamper urging plate so that it elastically urges the disc against said turntable in the pressing position; and a guide portion, connecting said first and second operating portions, for releasing the urging force of said clamper urging plate.

7. A disc clamping device as claimed in claim 6, wherein said control slider controls the movement of said clamper arm and controls the movement of said turntable to a position in which the disc can be placed thereon.

8. A disc clamping device as claimed in claim 5, wherein said control slider controls the movement of said clamper arm and controls the movement of said turntable to a position in which the disc can be placed thereon.

9. A disc clamping device as claimed in claim 1, wherein said arm urging means is constructed so as to urge the disc against said turntable via said clamper arm when said clamper is located in the disc pressing position and to release the urging force while said clamper arm is pivoting.

10. A disc clamping device as claimed in claim 9, wherein said urging plate operating portion comprises:

a first operating portion for operating said clamper urging plate so that it elastically urges said clamper toward a side opposite to the turntable side in the standby position of the clamper;

a second operating portion for operating said clamper urging plate so that it elastically urges the disc against said turntable in the pressing position; and a guide portion, connecting said first and second operating portions, for releasing the urging force of said clamper urging plate.

11. A disc clamping device as claimed in claim 10, wherein said control slider controls the movement of said clamper arm and controls the movement of said turntable to a position in which the disc can be placed thereon.

12. A disc clamping device as claimed in claim 9, wherein said control slider controls the movement of said clamper arm and controls the movement of said turntable to a position in which the disc can be placed thereon.

13. A disc clamping device having a turntable, a clamper arranged opposite to said turntable, and a tray which can be moved toward a space between said turntable and said clamper with a disc retained thereon, and said device being operable to rotatably support the disc moved by said tray on said turntable while pressing the disc by means of said clamper, said disc clamping device comprising:

a clamper arm which rotatably supports said clamper and is pivotally provided approximately in a direction of the axis of rotation of said clamper, said clamper arm being operable to move said clamper between a disc pressing position in which the clamper presses the disc on said turntable and a standby position in which the clamper is located apart from the disc;

a clamper arm moving means engaged with said clamper arm for pivotally moving said clamper arm; and a tray regulating portion which constitutes a part of said clamper arm moving means and is able to regulate behavior of said tray in the direction of thickness, said tray regulating portion coming close to a peripheral portion of said tray when said clamper is located in the standby position and moving apart from said tray when said clamper is located in the disc pressing position.

14. A disc clamping device as claimed in claim 13, wherein a gap between said tray regulating portion and said tray in a state in which the tray regulating portion comes close to the peripheral portion of the tray is set smaller than the thickness of the disc.

15. A disc clamping device as claimed in claim 14, wherein said disc clamping device is assembled into a disc changer provided with a plurality of trays.

16. A disc clamping device as claimed in claim 13, wherein said disc clamping device is assembled into a disc changer provided with a plurality of trays.

\* \* \* \* \*